US009137946B2

(12) United States Patent
Verhaeghe et al.

(10) Patent No.: US 9,137,946 B2
(45) Date of Patent: Sep. 22, 2015

(54) COMBINE HARVESTER WITH AUTOMATIC HYDRAULIC AND ELECTRIC HEADER COUPLING

(75) Inventors: Didier O. M. Verhaeghe, Ypres (BE); Steven G. M. Van Overbeke, Maldegem (BE); Frederik Verschave, Alveringem (BE); Robrecht M. K. Dumarey, Gistel (BE); Bart M. A. Missotten, Winksele (BE); David Coppé, Zedelgem (BE); Frederick Muys, Torhout (BE)

(73) Assignee: CNH Industrial America LLC, New Holland, PA (US)

( * ) Notice: Subject to any disclaimer, the term of this patent is extended or adjusted under 35 U.S.C. 154(b) by 273 days.

(21) Appl. No.: 13/805,994

(22) PCT Filed: Jun. 22, 2011

(86) PCT No.: PCT/EP2011/060416
§ 371 (c)(1),
(2), (4) Date: Mar. 21, 2013

(87) PCT Pub. No.: WO2011/161143
PCT Pub. Date: Dec. 29, 2011

(65) Prior Publication Data
US 2013/0219846 A1 Aug. 29, 2013

(30) Foreign Application Priority Data

Jun. 22, 2010 (BE) .................................. 2010/0368

(51) Int. Cl.
*A01B 73/00* (2006.01)
*A01D 41/16* (2006.01)
*A01D 41/14* (2006.01)

(52) U.S. Cl.
CPC .............. *A01D 41/16* (2013.01); *A01D 41/145* (2013.01); *Y10T 29/49448* (2015.01)

(58) Field of Classification Search
CPC ...... A01B 59/043; A01B 71/06; Y10S 56/09; B60D 1/04; B60D 1/26
USPC ................ 56/228, DIG. 9, 15.6, 208, 14.9, 2; 280/479.1, 504, 508, 510; 172/275, 172/272, 678
See application file for complete search history.

(56) References Cited

U.S. PATENT DOCUMENTS 3,324,637 A * 6/1967 Windsor et al. ................ 56/15.6
3,431,711 A * 3/1969 Claas .............................. 56/15.6
3,488,930 A * 1/1970 Feldmann et al. .................. 56/2

(Continued)

FOREIGN PATENT DOCUMENTS

EP 676123 A1 * 10/1995 ............. A01D 41/16
EP 1987713 A1 * 11/2008 ............. A01D 41/14
GB 2471477 A * 1/2011 ............. A01D 41/14

*Primary Examiner* — Árpád Fábián-Kovács
(74) *Attorney, Agent, or Firm* — Patrick M. Sheldrake; Seyed V. Sharifi T.

(57) ABSTRACT

The feeder of a combine has at least one rotatable cam and hook, rotatable about a common axis. The cam is arranged to gradually reduce the distance between the feeder and the header by rotating the cam away from the header and the hook is arranged to grip a bar located on the header as the cam is being rotated away from the header, thereby securing the header to the feeder. A coupling mechanism automatically establishes a hydraulic and/or electric coupling between the feeder and the header, through the reduction of the distance between feeder and header.

15 Claims, 9 Drawing Sheets

(56) References Cited

U.S. PATENT DOCUMENTS

| | | | |
|---|---|---|---|
| 3,638,407 A * | 2/1972 | Togami | 56/15.6 |
| 4,253,295 A * | 3/1981 | Knepper | 56/15.6 |
| 4,266,391 A * | 5/1981 | McDuffie et al. | 56/14.5 |
| 4,280,317 A * | 7/1981 | Lindblom et al. | 56/15.6 |
| 4,313,294 A * | 2/1982 | Martenas | 56/15.8 |
| 4,444,000 A | 4/1984 | Enzmann et al. | |
| 4,707,972 A * | 11/1987 | Knepper | 56/10.2 R |
| 4,742,671 A * | 5/1988 | Bich | 56/15.9 |
| 6,047,982 A * | 4/2000 | McClure et al. | 280/515 |
| 6,073,431 A * | 6/2000 | Osborne et al. | 56/15.7 |
| 6,318,057 B1 * | 11/2001 | Burmann | 56/10.2 R |
| 6,519,923 B1 | 2/2003 | Cooksey et al. | |
| 6,619,020 B1 * | 9/2003 | Chaney et al. | 56/10.9 |
| 6,735,929 B2 * | 5/2004 | Watts et al. | 56/14.9 |
| 6,899,509 B1 * | 5/2005 | Mailleux | 414/723 |
| 7,364,181 B2 * | 4/2008 | Patterson | 280/504 |
| 7,497,459 B2 * | 3/2009 | Johnson et al. | 280/515 |
| 7,918,076 B2 * | 4/2011 | Talbot | 56/208 |
| 8,631,634 B2 * | 1/2014 | Vereecke et al. | 56/14.9 |
| 8,745,964 B2 * | 6/2014 | Patterson et al. | 56/208 |
| 8,769,920 B2 * | 7/2014 | Patterson et al. | 56/228 |
| 2007/0214760 A1 * | 9/2007 | Bomleny et al. | 56/10.2 E |
| 2008/0271425 A1 * | 11/2008 | Ricketts et al. | 56/15.6 |

* cited by examiner

COMBINE HARVESTER WITH AUTOMATIC HYDRAULIC AND ELECTRIC HEADER COUPLING

FIELD OF THE INVENTION

The present invention is related to agricultural harvesting machines, such as combine or forage harvesters, and in particular to the automatic electric and hydraulic coupling of a header to the feeder of a harvesting machine.

STATE OF THE ART

In many existing combine harvesters, the coupling of a header to the feeder or straw elevator of the combine is an operation involving a number of steps, several of which require manual intervention by the combine operator. To establish an initial connection, the header is positioned on the ground or on a dedicated trailer. The operator drives the combine up to the header, first lowering the straw elevator and then lifting it up by a hydraulic lifting system, until an interlocking contact is established, e.g., between a cradle on the feeder and an interlocking beam on the header. The feeder then further lifts up the header until the rear face of the header rests against the front face of the feeder. At that point, the operator needs to manually secure the header by a suitable locking mechanism, e.g. by rotating a hook located at the underside of the feeder until it grabs a pin or bar located at the rear face of the header. After that, the operator manually connects the drive shaft of the header to the drive shaft of the feeder. Also, electrical cables and hydraulic lines on the header and the feeder respectively must be connected manually. Such manual operations are often impractical, time consuming and unsafe.

AIM OF THE INVENTION

It is an object of the invention to provide a combination of a harvesting machine and a header provided with a means for automatically establishing the hydraulic and/or electric coupling between the header and the feeder.

SUMMARY OF THE INVENTION

The present invention is related to an agricultural machine and a method as disclosed in the appended claims. The machine and method of the invention allow automatically securing the header to the feeder, and at the same time establishing the electrical and/or hydraulic coupling between the header and the feeder. In the preferred case, both electrical and hydraulic coupling is established ('and' option of the 'and/or').

The invention is related to an agricultural machine comprising a feeder and a detachable header, the feeder comprising a means for lifting up the header from the ground or from a trailer, the lifting means comprising a carrying structure for supporting a beam or the like located on the header, characterized in that:

the feeder comprises at least one rotatable cam located lower than the carrying structure, and actuating means for rotating the cam about an axis, wherein the cam and actuating means are configured to:

maintain the lower portion of the header at a distance from the feeder, after the header has been lifted from the ground or trailer, by extending the cam towards the header; and gradually reduce the distance between the feeder and the header, by rotating the cam away from the header, the header being provided with a support surface that the cam contacts during at least a part of its rotation;

the feeder further comprises at least one first hook, configured for rotation by said actuating means about said axis, whilst maintaining a fixed relative position with respect to the cam, said position being such that the hook rotates towards the header while the cam moves away from the header, so that the hook thereby grips a bar or pin located on the header, thereby securing the header to the feeder; and the agricultural machine is provided with a coupling mechanism for automatically establishing a hydraulic and/or electric coupling between the feeder and the header, said mechanism comprising a first coupling part mounted on the header, and a second coupling part mounted on the feeder, the coupling parts being configured so as to automatically interlock and thereby establish the hydraulic and/or electric coupling, said interlock being actuated by the reduction of the distance between the feeder and the header.

According to a preferred embodiment, the actuating means comprise at least one hydraulic cylinder, configured to actuate the rotation of a lever that is configured to actuate the rotation of the hook and the cam about the axis.

According to an embodiment there is provided an agricultural machine, wherein:

the first coupling part comprises a panel comprising connector holding means for receiving connectors of electric cables and/or hydraulic supply lines, the second coupling part comprises a connection plate, equally comprising connector holding means, one of the panel and the connection plate is arranged in a fixed position with respect to the one of the header and the feeder on which it is mounted, and the other of the panel and the connection plate is movably arranged with respect to the other of the header and the feeder; and the panel and the connection plate are configured so as to be at an angle to each other when the cam is holding the header away from the feeder, and to gradually approach each other and become substantially parallel and in mutual contact when the rotation of the cam reduces the distance between the feeder and the header, so that when the header is secured to the feeder, a connection is established between connectors held by the panel and connectors held by the connection plate.

The movable part of panel or connection plate preferably is linearly movable in horizontal and vertical directions against the bias of springs and/or rotatably movable about a horizontal axis.

According to an embodiment, the panel is mounted in a fixed position with respect to the header and the connection plate is movable with respect to the feeder.

According to an embodiment, there is provided an agricultural machine, wherein:

the second coupling part comprises a frame, two side axle elements, four vertical guide pins, two profiles, two connection blocks, two first springs and four second springs;

the connection plate is mounted in the frame which is mounted between the profiles, with one connection block being slidably mounted inside each of the profiles;

the connection plate further is held between the side axle elements, inserted through holes in the connection blocks and through elongate openings in the profiles, the side axle elements being slidable with respect to the connection blocks, with the first springs arranged around the ends of the side axle elements, so as to allow a horizontal movement of the connection plate against the bias of the first springs, as well as a rotation of the connection plate about a rotation axis defined by the side axle elements;

the vertical guide pins are slid in openings provided in the connection blocks, the vertical guide pins being furthermore slidably arranged between plate elements which are attached to the support bracket; and the second helical springs are arranged around the vertical guide pins, so as to allow a vertical movement of the frame, against the bias of the second springs.

According to an embodiment, one of the panel of the first coupling part and the connection plate of the second coupling part is provided with a centering ring and the other of the panel and the connection plate is provided with a centering opening, configured to receive the centering ring.

According to an embodiment, one of the first coupling part and the second coupling part comprises a number of conical positioning holes, and wherein the other of the first coupling part and the second coupling part comprises a same number of positioning pins, configured to cooperate with the conical positioning holes for establishing an alignment between the first and second coupling parts.

According to an embodiment, the machine further comprises a securing mechanism comprising at least one second hook, pivotably arranged on the second coupling part, and connected via a linkage mechanism to the actuating means of the cam and the first hook, so that when the first hook rotates forwards, the second hook also rotates forwards, to thereby grab a horizontal pin arranged on the first coupling part, to thereby secure the hydraulic and/or electric coupling mechanism.

According to an embodiment, the machine of the invention further comprises a protective cap for protecting the coupling mechanism and arranged to rotate together with the second hook.

According to an embodiment, the machine of the invention further comprises a damping material mounted between the first coupling part and the header.

According to an embodiment, the machine of the invention further comprises an automatic mechanical drive coupling mechanism, which is configured to be actuated by the at least one cam and at least one hook.

The invention is also related to a method for coupling a header to a feeder of an agricultural machine, comprising the steps of:

driving the agricultural machine with the feeder attached to the front up to the header, while lowering the feeder until a carrying structure on the feeder is placed under a beam on the header;

lifting up the header, so that it hangs on to the carrying structure;

rotating a cam on the feeder, the cam being located lower than the carrying structure and positioned, before said rotation, to maintain the header at a distance from the feeder, wherein the cam is rotated away from the header, thereby reducing the distance between the feeder and the header; and simultaneously with the rotation of the cam, rotating a hook about the same rotation axis as the cam, until the hook grips a bar or pin located on the header, to thereby secure the header, wherein the movement of the header towards the feeder actuates an automatic hydraulic and/or electrical coupling between the feeder and the header by interlocking a first coupling part mounted on the header with a second coupling part mounted on the feeder

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
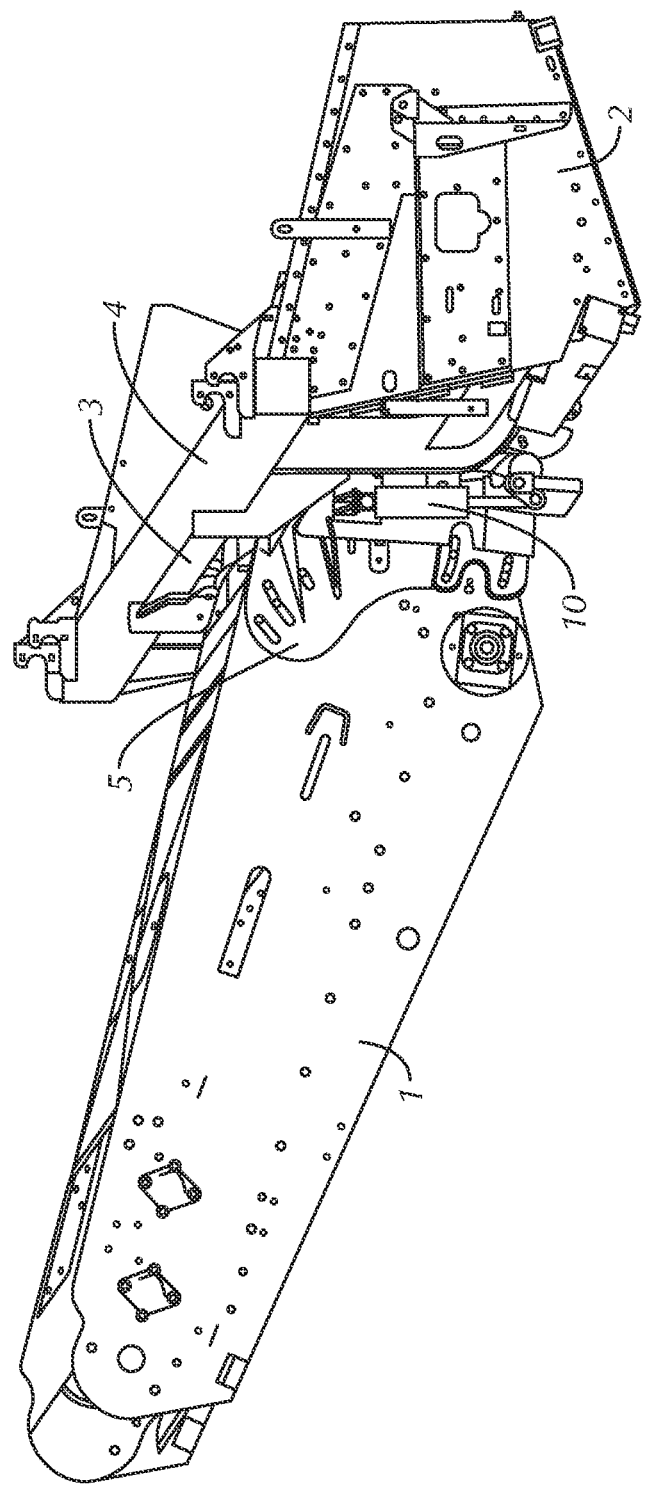
FIG. 1 is a 3-D view of a header and feeder in a combine harvester according to the invention, showing the cam-and-hook securing mechanism according to the invention in a non-secured position.
Figure 2A:
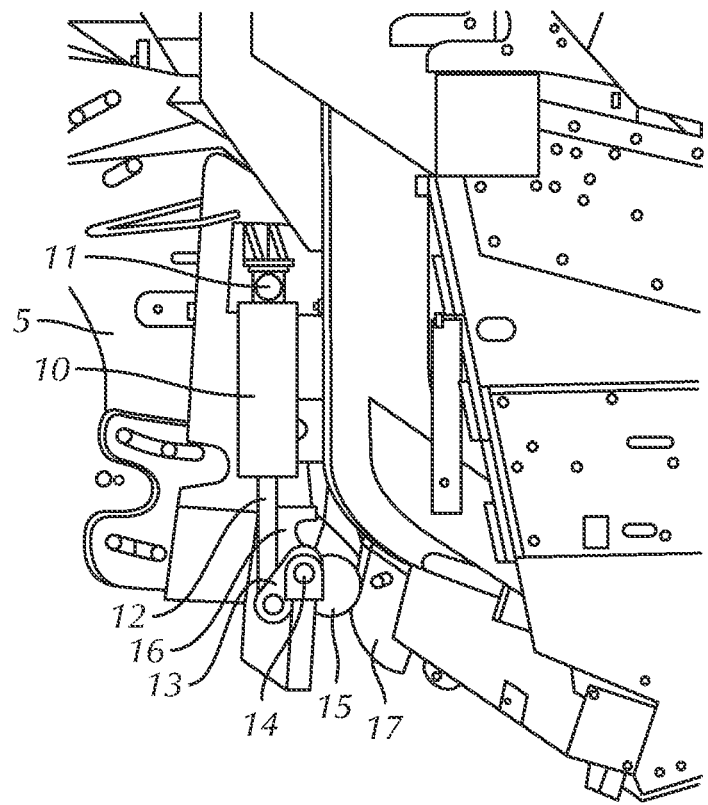
FIG. 2a is an enlarged side view of the same combination, showing a cam-and-hook securing mechanism according to the invention in a non-secured position.
Figure 2B:
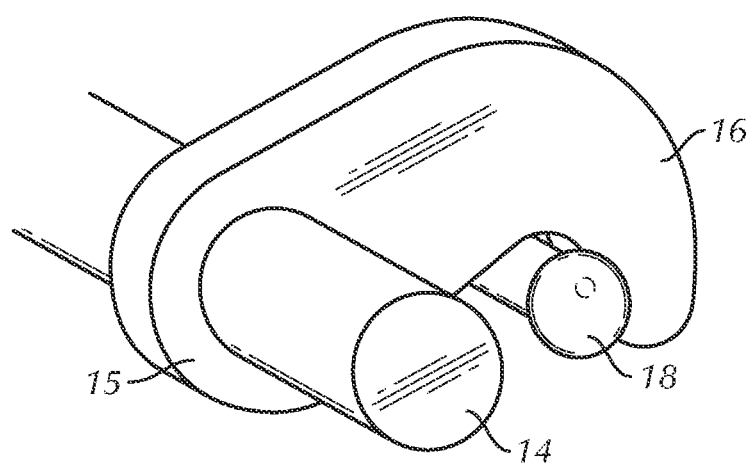
FIG. 2b shows a further detail of the securing mechanism.
Figure 3:
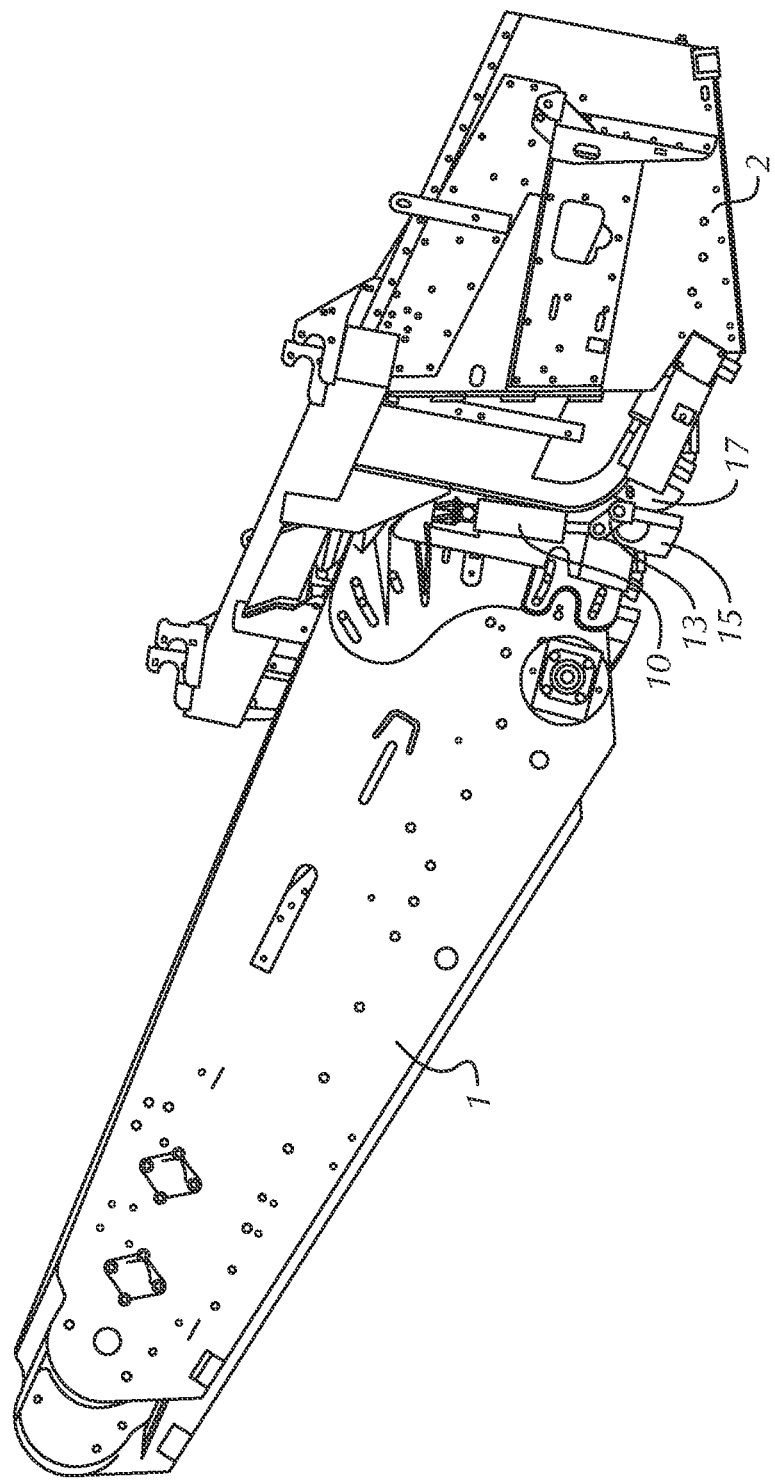
FIG. 3 is a side view of the header and feeder of FIG. 1, showing the cam-and-hook securing mechanism in a secured position.

FIG. 1 shows a side view of a straw elevator or feeder 1 and a grain header 2 of a combine harvester according to the present invention. The feeder 1 is operatively attached to the combine frame (not shown) in a known manner. The feeder shown comprises a lateral float assembly including a lateral float frame 5, mounted to the front of the feeder, and a cradle 3 arranged to be able to rotate about a pin extending in the direction of travel, to thereby allow lateral floatation of the cradle and a header mounted thereon. The lateral float assembly can be a subassembly as known in the art. The invention is preferably related to a feeder comprising such a lateral float frame assembly, but not limited thereto. The initial connection between the feeder 1 and the header 2 is established by interlocking the top of the cradle 3 of the feeder with an upper horizontal beam 4 of the header. Cradle 3 and beam 4 can be identical to parts in existing feeder/header combinations. In the position shown in FIG. 1, the header 2 has been lifted from the ground or trailer by the cradle/beam interlock, and the header 'hangs' on to the cradle 3. As shown in further detail in FIG. 2a, the feeder comprises a hydraulic cylinder 10, attached to a fixed point 11 on the lateral float frame 5 of the feeder. The telescopic rod 12 of the cylinder 10 is shown in its most extended state in FIGS. 1 and 2. The movement of the rod 12 actuates the rotation of a lever 13 and a transverse shaft 14, to which a cam element 15 and a hook element 16 are attached, i.e., the hook and cam rotate together with shaft 14 and have a fixed position with respect to each other. The hook and cam extend from the shaft 14, in such a manner that their respective rotations combine to rotate the lower part of the header towards the feeder, while the hook moves downward to secure the header by grabbing a pin or bar 18 (see detail in FIG. 2b). To this end, the header is provided with abutments, such as plate elements 17, located in the same vertical plane as the cam elements 15. In the embodiment of FIGS. 1 to 3, a hydraulic cylinder 10 and a lever 13 are arranged on one side of the feeder 1 and the shaft 14 extends towards the other side, carrying a hook and a cam on both sides of the feeder. It is also possible to provide a cylinder and lever on both sides of the feeder. In the preferred embodiment described hereinafter, two cams 15 and two hooks 16 are provided (one set of cam+hook on each side of the feeder). It is also possible to provide more than two cam+hook sets, or to provide only one cam and one hook, actuated by at least one cylinder/lever arrangement for securing the header. In this latter embodiment, the single cam and hook can be configured in the same way as the cam/hook arrangements described above. Finally, it is possible to provide a different number of cams and hooks (e.g. one cam and two hooks).

In the non-secured starting condition shown in FIGS. 1 and 2a, the lower side of the header 2 is maintained at a distance from the lower side of the feeder 1 because of the forward position of the cams 15 (one on each side). Then the cylinder 10 is actuated and moves to the position shown in FIG. 3. This movement entails the gradual rotation of the cams 15 away from the header body, while staying in contact with the plate elements 17, thereby gradually reducing—in a controlled way—the distance between header and feeder. While the cams 15 retract from the header, the hooks 16 come forward and grab a transverse pin or bar 18 on the header, to thereby automatically secure the header. A side view of this end position is shown in FIG. 3.

Figure 4:
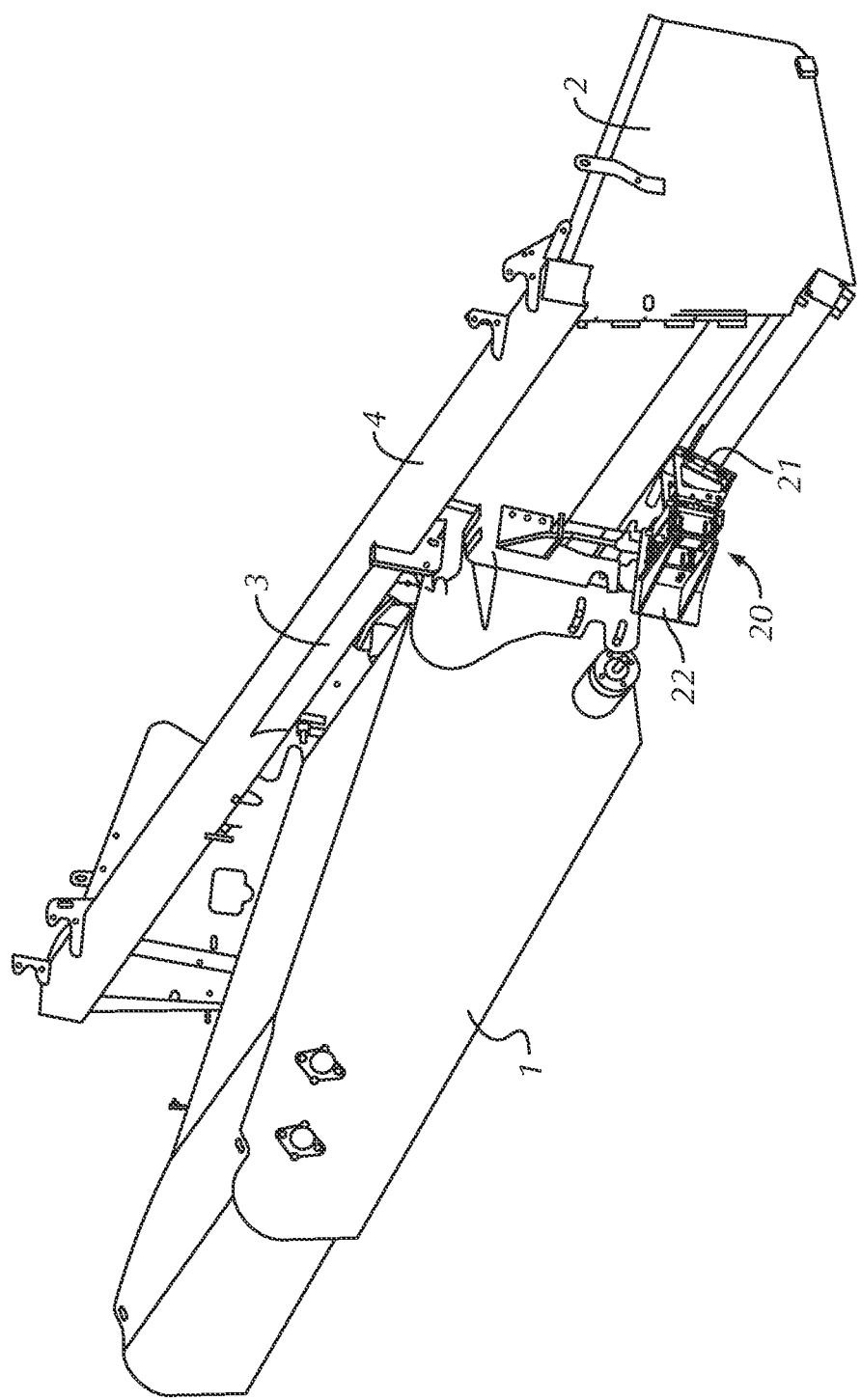
FIG. 4 is a 3-D view of the same combination, showing also the hydraulic/electric coupling mechanism according to a preferred embodiment.

According to the invention, the cam-and-hook mechanism is cooperatively arranged with an automatic coupling mechanism 20 for the hydraulic and electric coupling between the feeder 1 and the header 2, as shown in FIG. 4. The gradual movement of the header 2 towards the feeder 1 is also the actuating movement for establishing the hydraulic and electric coupling, as will be described in further detail hereinafter. The movement can also be used for the coupling of the mechanical drive line (not shown).

In the embodiment shown in FIG. 4, the hydraulic/electric coupling mechanism 20 is located at the right hand side of the feeder, and (as shown in greater detail in FIG. 5) comprises two parts, a header coupling part 21 mounted on the header 2, and a feeder coupling part 22 mounted on the feeder 1. These parts will be described in detail herafter, before describing their interaction, as actuated by the cam-and-hook mechanism (15, 16). The header coupler part 21 is shown in detail in FIG. 6. It comprises a panel 23, provided with connector holders 24 and a centering ring 25. The connector holders 24 are configured to receive male or female connectors of electrical cables and hydraulic supply lines (not shown) leading to various electrically and hydraulically actuatable parts of the header. Two conical positioning holes 26 are provided at the lower end of the panel 23. The panel 23 is immovably affixed to a support bracket 30, which itself is affixed to the header 2. The bracket 30 comprises upstanding portions 31, between which the panel 23 is held. In the embodiment shown, the bracket 30 is attached to a lower beam 32 of the header 2 by means of U-shaped fasteners 33. The bracket 30 and its upstanding portions 31 are configured to mount the panel 23 at a specific angle with respect to the body of the header 2. According to an embodiment (not shown), a damping material may be mounted between the beam 32 and the support bracket 30, so as to allow a limited movement of the bracket with respect to the beam. The damping material may be a piece of foam.

Figure 7:
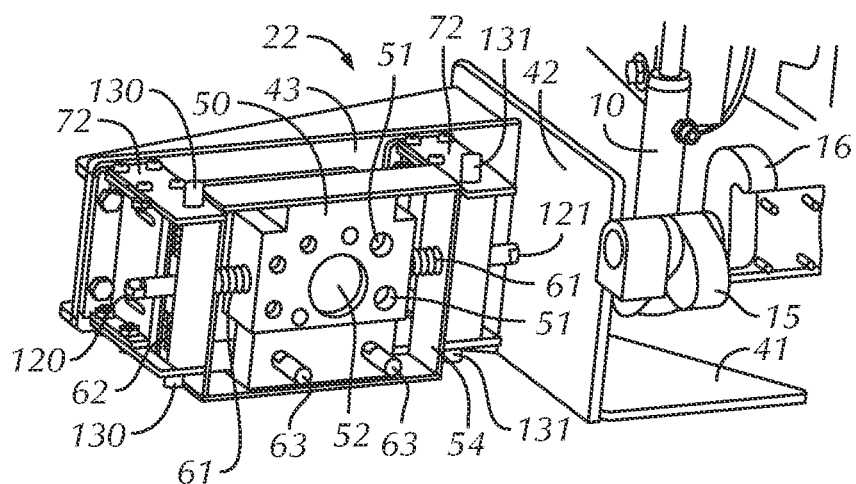
FIG. 7 is a detail of the feeder coupling part of the hydraulic/electric coupling mechanism of FIG. 4.
Figure 8:
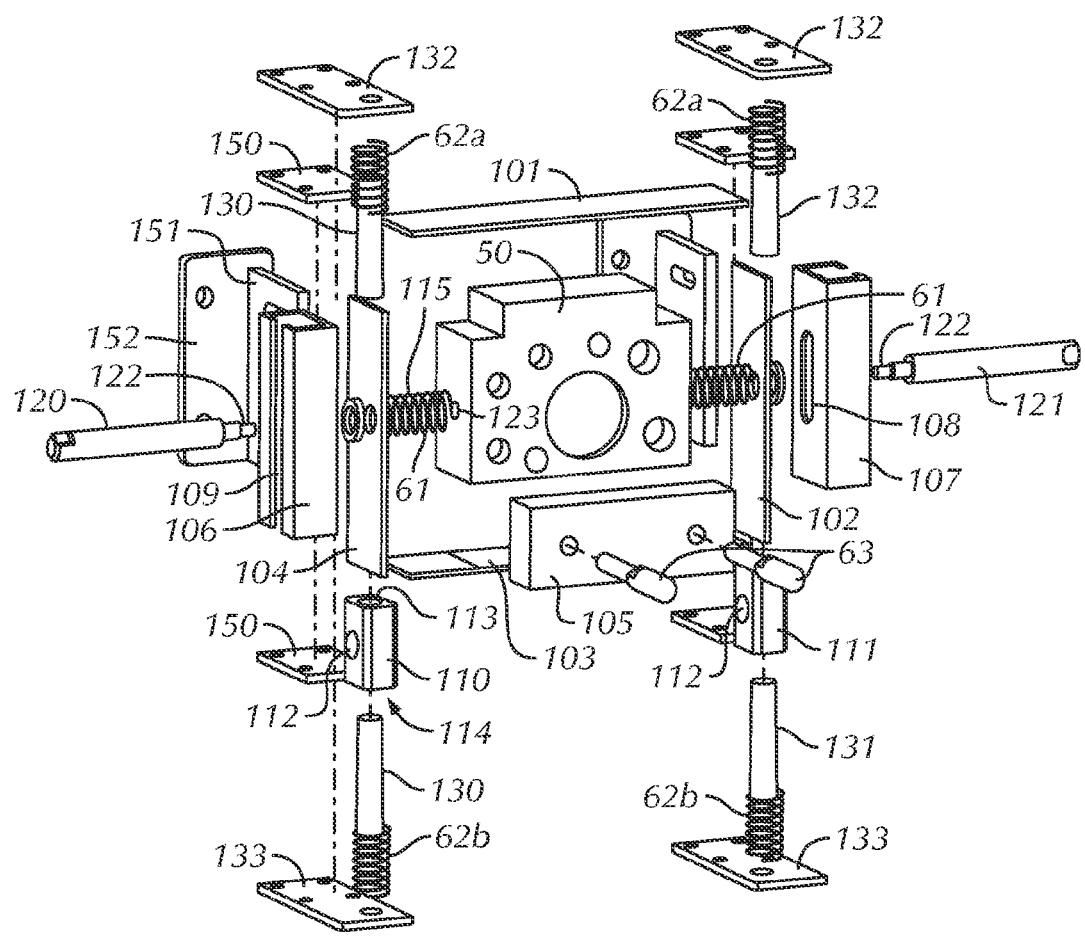
FIG. 8 is an exploded view of the feeder coupling part of FIG. 7.

The feeder coupling part 22 is shown in detail in FIG. 7, and an exploded view of this part is shown in FIG. 8. This coupling part 22 is fixed to the lateral floatation frame 5 of the feeder, through a support bracket 40. The support bracket 40 may be mounted next to the cam-and-hook mechanism (15, 16) as shown in FIG. 7. The bracket 40 comprises a horizontal portion 41 attached to the underside of the lateral float frame. The bracket further comprises a vertical plate 42 welded to the horizontal portion 41, and a laterally extending plate portion 43 welded to the vertical plate 42, the front surface of said laterally extending portion 43 facing in the direction of travel of the harvester. A moveable connection plate 50 is mounted in front of this laterally extending portion 43. The size and orientation of the bracket 40 and of the connection plate 50 are such that, when the header 2 is mounted onto the feeder 1, the connection plate 50 is facing the panel 23 of the header coupling part 21.

Figure 5:
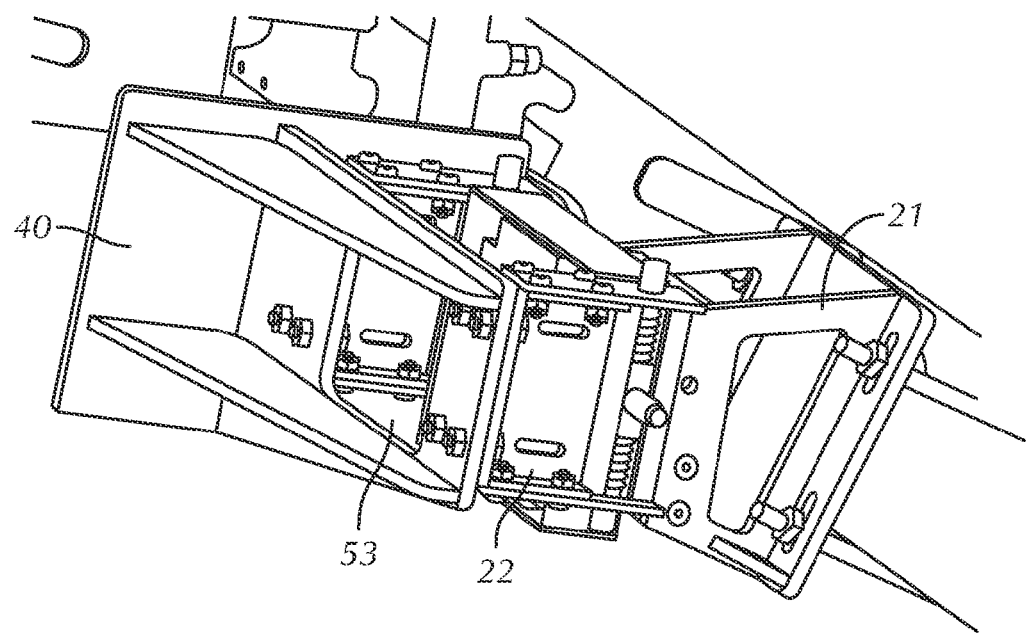
FIG. 5 is detailed view of the hydraulic/electric coupling mechanism of FIG. 4.
Figure 6:
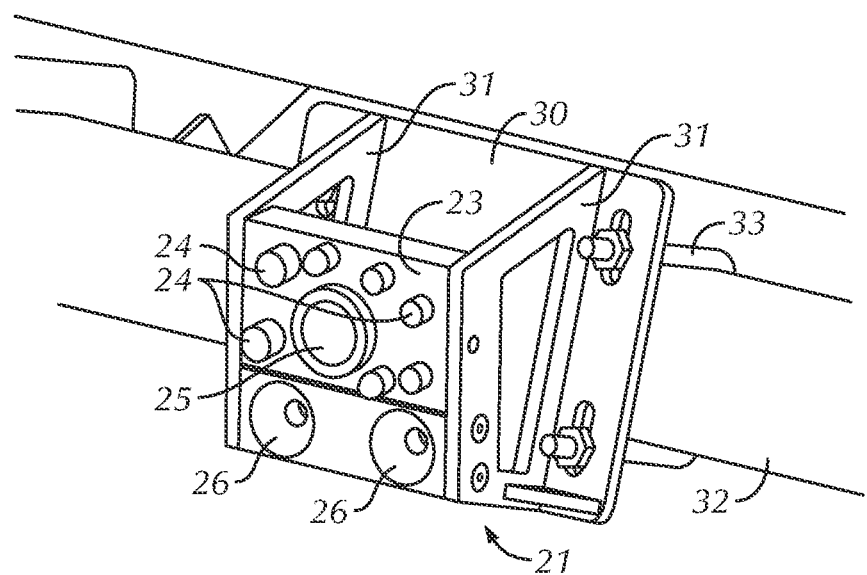
FIG. 6 is a detail of the header coupling part of the hydraulic/electric coupling mechanism of FIG. 4.

The moveable connection plate 50 comprises connector holding holes 51 and a centering opening 52, arranged to receive the centering ring 25 of the header coupling part 21. The connector holding holes 51 are configured to receive and hold the connector ends of electrical cables and hydraulic supply lines (not shown) coming from respective electrical and hydraulic power sources mounted on the combine, said cables and lines being led towards the connection plate 50 through an opening 53 in the laterally extending portion 43 of the bracket 40 (FIG. 5). The moveable plate 50 is mounted inside a rectangular frame 54, which can rotate about a pair of horizontal side axles 120, 121, extending from the sides of the plate 50. At the same time, the plate 50 can move linearly within this frame 54 in a transverse horizontal direction, while being biased to the center by helical springs 61 provided over the axles 120, 121 between the plate 50 and the frame 54. The frame 54 is provided with a pair of vertical guide pins 130, 131 on each side of the frame. These guide pins extend slideably through holes in upper and lower plates 132, 133 of side portions 72, which are removably connected to the lateral bracket portion 43. The frame 54 and the plate 50 as a whole can move vertically with respect to the bracket 40, said vertical movement being restrained by a further set of helical springs 62 mounted over the guide pins 130, 131 between the upper and lower plates 132, 133. Positioning pins 63 extend forwardly from the lower portion 105 of the connection plate 50, for cooperation with the conical openings 26 of the header coupling part 21. The various parts that make up the frame 54 and its connection to the bracket 40 are shown in detail in FIG. 8. The frame 54 is built up from four rectangular plate elements 101-104: a top plate element 101, a bottom plate element 103 and two side plate elements 102, 104. Between these four plate elements, the movable connection plate 50 and its lower portion 105 are held, into which lower portion the positioning pins 63 have been inserted. Upright profiles 106, 107 are arranged adjacent to the side plate elements 102, 104 respectively. The profiles have a vertical slot 108 at the side directly adjacent the plate elements, and a slit-shaped opening 109 (preferably over the entire length of the profile) at the opposite side. Connection blocks 110, 111 are arranged inside the profiles, each block being provided with one side opening 112 and top and bottom openings 113, 114. The side axles 120, 121 are provided through the slit-shaped openings of each profile 106, 107, through the side opening 112 of the connection blocks 110, 111, and through holes 115 provided in the side plate elements 102, 104. The side axles 120, 121 are provided with end portions 122 of smaller diameter (preferably in several decreasing steps), which are configured to enter into side holes 123 provided in the connection plate 50, the helical springs 61 being arranged around the end portions 122. In this way, the springs 61 hold the plate in a central horizontal position, while limited deviations from this position are possible by biasing the connection plate 50 laterally against the spring force of one or the other of the springs. The lateral movement of the plate 50 is made possible by a sliding of the axle elements 120, 121 with respect to the connection blocks 110, 111, while a rotation of the plate 50 is made possible by rotation of the axles 120, 121 inside the respective connection blocks 110, 111.

Two sets of vertical guide pins 130, 131 are inserted and fixed in the top and bottom openings 113, 114 of each of the connection blocks 110, 111, one set 130 on one side of the plate 50, another set 131 on the opposite side. The outer ends of the vertical guide pins are slidably inserted into holes of the upper and lower plates 132, 133, with the springs 62 arranged around each of the vertical guide pins. The upper and lower plates 132, 133 are removably attached to the support bracket 40. In this way, the springs 62 hold the frame 54 (including the plate 50) in a central vertical position while limited deviations from this position are possible by biasing the frame 54 vertically against the spring force of the upper pair of springs 62a or the lower pair of springs 62b. The limited vertical movement of the frame 54 is possible by sliding the connection blocks 110, 111 inside the profiles 106, 107, and by sliding the vertical guide pins 130, 131 with respect to the upper and lower plates 132, 133. Finally, a weld assembly, comprising a pair of horizontal plates 150, an upright plate 151 and a rear plate 152 is provided on each side of the connection plate 50 for removably attaching the upper and lower plates 132, 133 to the lateral plate portion 43 of the support bracket 40 (FIG. 7).

This arrangement allows a movement of the plate 50 with respect to bracket 40 with four degrees of freedom, in order for the plate 50 to be positioned correctly with respect to the panel 23 of the header coupling part 21, when the two parts interlock, as described in the next paragraph.

In operation, when the header 2 is first lifted from the ground or trailer and the lower portion thereof is held at a distance from the feeder 1 by the cams 15, the panel 23 of the header coupling part 21 has a position at an angle with respect to the connection plate 50 of the feeder coupling part 22. As the hydraulic cylinder 10 is actuated, the cams 15 are rotated and the panel 23 approaches the connection plate 50. The positioning pins 63 engage with the conical positioning holes 26 to establish an initial alignment of the plate 50 and the panel 23. As the distance between the coupling parts 21, 22 decreases and the positioning pins 63 further engage with the positioning holes 26, the freedom of movement of the plate 50 allows a correct alignment of the coupling parts 21 and 22. Finally, the plate 50 reaches a position wherein it is parallel and in full contact with the panel 23, as shown in FIG. 5 (also at this moment, the centering ring 25 is engaged into the centering opening 52). When the hydraulic cylinder 10 has reached its end position, whereby the hooks 16 finally secure the header 2 to the feeder 1, the correctly aligned position of the connector holders 24 and connector holding holes 51 ensures an automatic coupling of the hydraulic and electrical connectors mounted in the panel 23 and the plate 50. In this way, the cam-and-hook mechanism (15, 16) establishes, without additional actuating means, the hydraulic and electrical connection between the header 2 and the feeder 1.

Figure 9:
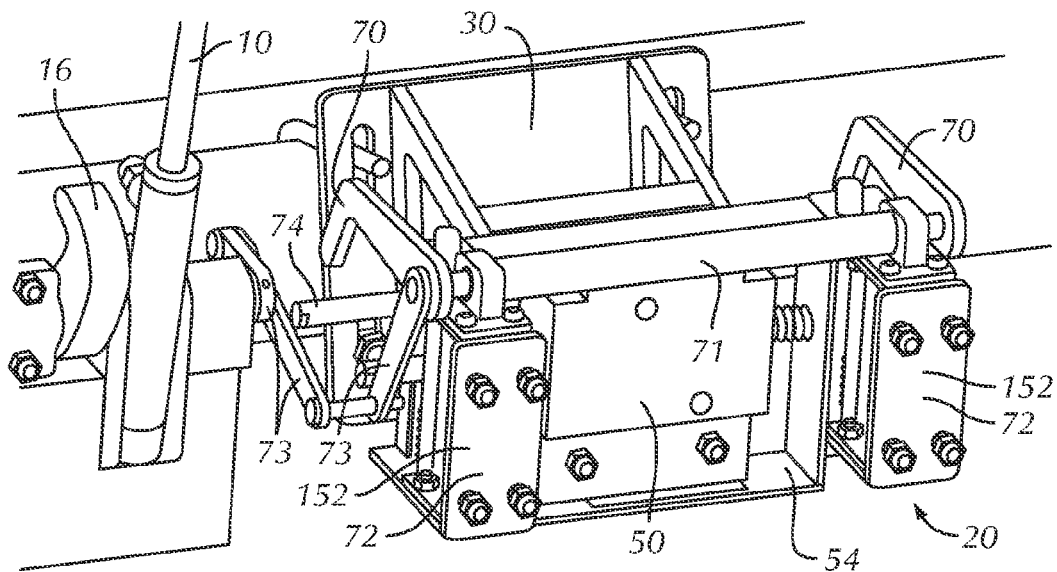
FIGS. 9 and 10 are views of a securing mechanism in open and closed conditions, for securing the coupling mechanism of FIG. 4.
Figure 10:
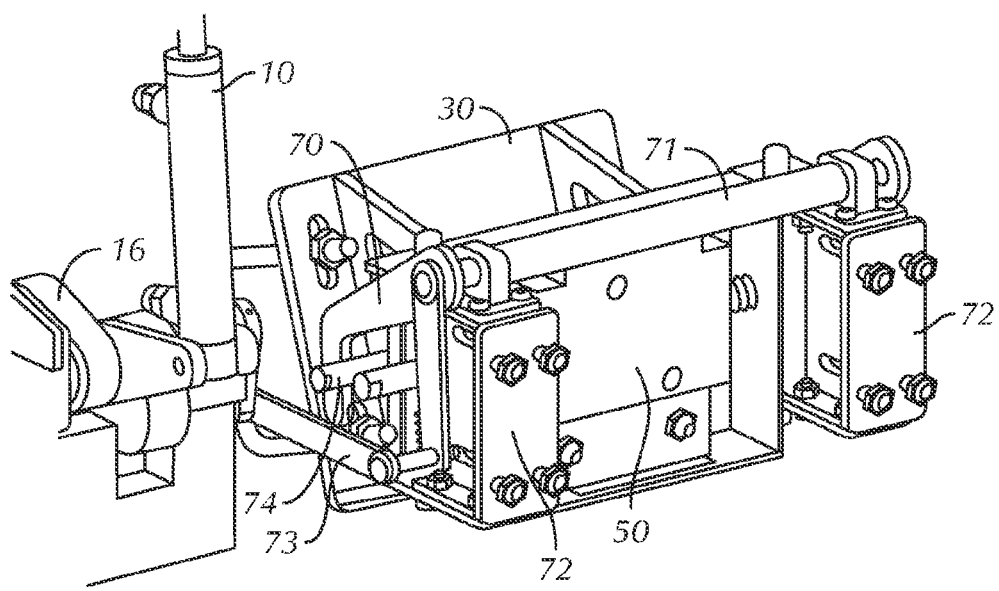

FIGS. 9 and 10 illustrate an embodiment wherein the hydraulic/electric coupling mechanism is provided with a securing mechanism. The latter mechanism comprises a set of second hooks 70 (the first hooks 16 being those of the header/feeder securing mechanism), pivotably arranged on top of the feeder coupling part 22. In the case shown, the second hooks 70 are affixed to a horizontal axle 71, pivotably fixed on the upper plates 132 of the side portions 72, which are bolted to the support bracket 40 (the latter not being shown in FIGS. 9-10), and below which side portions 72 the frame 54 is arranged. The side portions 72 are in fact defined by the upper and lower plates 132, 133 and the weld assembly of elements 150, 151 and 152 shown in FIG. 8. As seen in FIG. 9, a coupling between axle 71 and rotation shaft 14 of the cam-and-hook mechanism (15, 16) is established through a linkage mechanism 73 configured so that when the shaft 14 rotates forwards the first hooks 16 as actuated by the hydraulic cylinder 10, equally the second hooks 70 rotate forwards and downwards, so as to grab a transverse pin 74 arranged (in this embodiment) on the header coupling part 21. The result is shown in FIG. 10, with the coupling parts 21 and 22 secured to each other by the hooks 70. The securing mechanism may be provided with one hook 70 instead of two.

Figure 11:
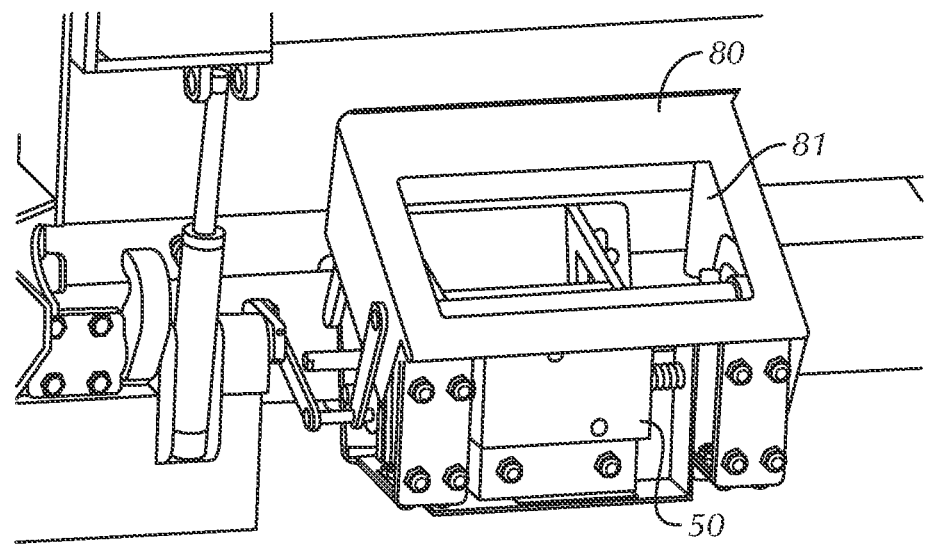
FIGS. 11 and 12 are views of the securing mechanism of FIGS. 9 and 10, provided with a protective cap.
Figure 12:
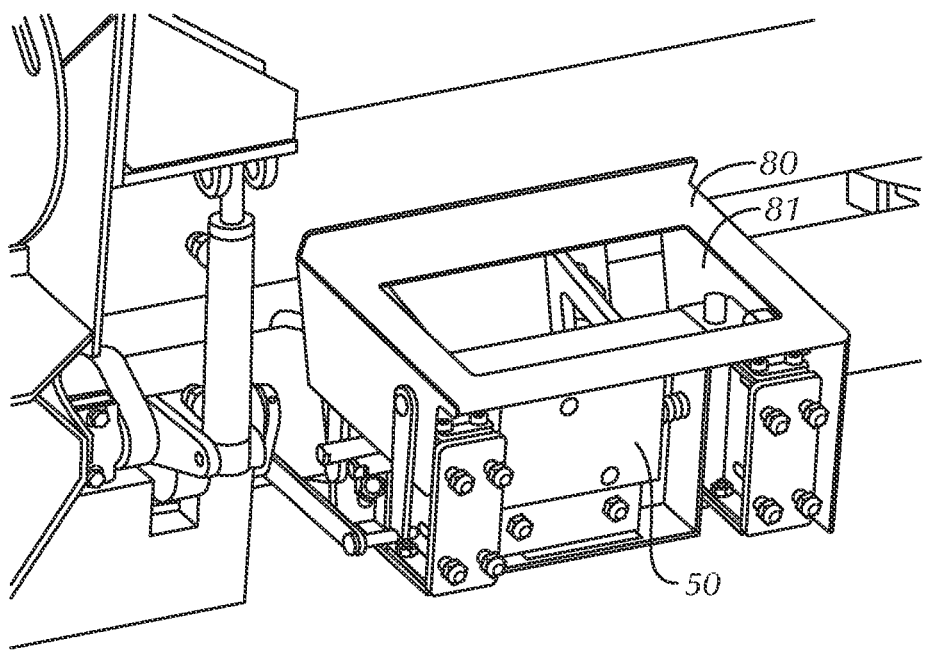

FIG. 11 shows another embodiment, wherein the securing mechanism is further provided with a protective cap 80, configured to pivot about the same axis as the second hooks 70, to thereby shield the coupling mechanism 20 from the environment. The cap 80 may be provided with a window 81, for allowing visibility of the coupling (though a closed cap is equally possible).

According to a particular embodiment, the present invention is related to an agricultural machine provided with the electric/hydraulic coupling mechanism 20, and with an automatic drive shaft coupling mechanism, which is equally configured to be actuated by the cam-and-hook mechanism (15, 16). Such an automatic drive shaft coupling mechanism is described in Belgian patent application n° BE2010/0053, incorporated herein by reference.

The invention claimed is:

1. An agricultural machine comprising a feeder and a detachable header, the feeder comprising a lift assembly for lifting up the header, the lifting assembly comprising a carrying structure for supporting a beam on the header, wherein
the feeder further comprises at least one rotatable cam located lower than the carrying structure, and an actuator for rotating the cam about an axis, wherein the cam and the actuator are configured to:
maintain the lower portion of the header at a distance from the feeder, after the header has been lifted from the ground or trailer, by extending the cam towards the header, and gradually reduce the distance between the feeder and the header, by rotating the cam away from the header, the header being provided with a support surface (17) that the cam contacts during at least a part of its rotation, the feeder further comprises at least one first hook, configured for rotation by said actuator about said axis (14), and connected to in a fixed relative angular position with respect to the cam, said position being such that the hook rotates towards the header while the cam moves away from the header, so that the hook thereby grips one of a bar and pin located on the header, thereby securing the header to the feeder; and
the agricultural machine is provided with a coupling mechanism for automatically establishing at least one of a hydraulic and electric coupling between the feeder and the header, said mechanism comprising a first coupling part mounted on the header, and a second coupling part mounted on the feeder, the coupling parts being configured so as to automatically interlock and thereby establish the at least one of a hydraulic and electric coupling, said interlock being actuated by the reduction of the distance between the feeder and the header.

2. The agricultural machine according to claim 1, wherein the actuating means includes at least one hydraulic cylinder (10), configured to actuate the rotation of a lever that is configured to actuate the rotation of the hook and the cam about the axis (14).

3. The agricultural machine according to claim 1, wherein:
the first coupling part includes a panel, comprising connector clamps for receiving connectors of at least one of electric cables and hydraulic supply lines;
the second coupling part includes a connection plate, equally comprising connector holding means (51);
one of the panel and the connection plate is arranged in a fixed position with respect to one of the header and the feeder on which it is mounted, and the other of the panel and the connection plate is movably arranged with respect to the other of the header and the feeder; and
the panel and the connection plate are configured so as to be at an angle to each other when the cam is holding the header away from the feeder, and to gradually approach each other and become substantially parallel and in mutual contact when the rotation of the cam reduces the distance between the feeder and the header, so that when the header is secured to the feeder, a connection is established between connectors held by the panel and connectors held by the connection plate.

4. The agricultural machine according to claim 3, wherein the movable one of the panel and the connection plate is able to move linearly in horizontal and vertical directions against the bias of springs.

5. The agricultural machine according to claim 3, wherein the movable one of the panel and the connection plate is able to move rotatably about a horizontal axis.

6. The agricultural machine according to claim 3, wherein the panel is arranged in a fixed position with respect to the header and the connection plate is movably arranged with respect to the feeder.

7. The agricultural machine according to claim 6, wherein the second coupling part includes a bracket fixed to the feeder, preferably fixed to a lateral floatation frame mounted on the feeder, and wherein the movable connection plate is movable with respect to the bracket.

8. The agricultural machine according to claim 7, wherein:
the second coupling part includes a frame, two side axle elements, four vertical guide pins, two profiles, two connection blocks, two first springs and four second springs;
the connection plate is mounted into the frame, which is mounted between the profiles, with one connection block being slidably mounted inside each of the profiles;
the connection plate is further held between the side axle elements, inserted through holes in the connection blocks and through elongate openings in the profiles, the side axle elements being slidable with respect to the connection blocks, with the first springs arranged around the ends of the side axle elements, so as to allow a horizontal movement of the connection plate against the bias of the first springs, as well as a rotation of the connection plate about a rotation axis defined by the side axle elements;
the vertical guide pins are inserted into openings provided in the connection blocks, the vertical guide pins furthermore being slidably arranged between plate elements which are attached to the support bracket; and
the second springs are arranged around the vertical guide pins, so as to allow a vertical movement of the frame against the bias of the second springs.

9. The agricultural machine according to claim 3, wherein one of the panel of the first coupling part and the connection plate of the second coupling part is provided with a centering ring and wherein the other of the panel and the connection plate is provided with a centering opening, configured to receive the centering ring.

10. The agricultural machine according to claim 1, wherein one of the first coupling part and the second coupling part includes a number of conical positioning holes, and wherein the other of the first coupling part and the second coupling part includes a same number
of positioning pins, configured to cooperate with the conical positioning holes for establishing an alignment between the first and second coupling parts.

11. The agricultural machine according to claim 1, further comprising a securing mechanism, the securing mechanism including at least one second hook, pivotably arranged on the second coupling part
and connected via a linkage mechanism to the actuator of the cam and the first hook, so that when the first hook rotates forwards, the second hook equally rotates forwards, to thereby grab a horizontal pin arranged on the first coupling part, to thereby secure the at least one of hydraulic and electric coupling mechanism.

12. The agricultural machine according to claim 11, further comprising a protective cap for protecting the coupling mechanism and arranged to rotate together with the second hook.

13. An agricultural machine according to claim 1, wherein a damping material is mounted between the first coupling part and the header.

14. The agricultural machine according to claim 1, further comprising an automatic drive shaft coupling mechanism, which is configured to be actuated by at least one additional cam and at least one additional hook.

15. A method for coupling a header having a beam to a feeder, having a carrying structure, of an agricultural machine, comprising the steps of:
lowering the feeder, until a carrying structure on the feeder is placed under a beam on the header;
lifting up the header, so that it hangs on to the carrying structure;
rotating a cam on the feeder, located lower than the carrying structure, and positioned, before said rotation, to maintain the header at a distance from the feeder, wherein the cam is rotated away from the header, thereby reducing the distance between the feeder and the header; and
simultaneously with the rotation of the cam, rotating a hook about the same rotation axis as the cam, until the hook grips a bar or pin located on the header, to thereby secure the header, wherein the movement of the header towards the feeder actuates at least one of a automatic hydraulic and electrical coupling between the feeder and the header by interlocking a first coupling part mounted on the header with a second coupling part mounted on the feeder.

* * * * *